Games Slayter
Henry Snow
INVENTORS

ATTORNEYS

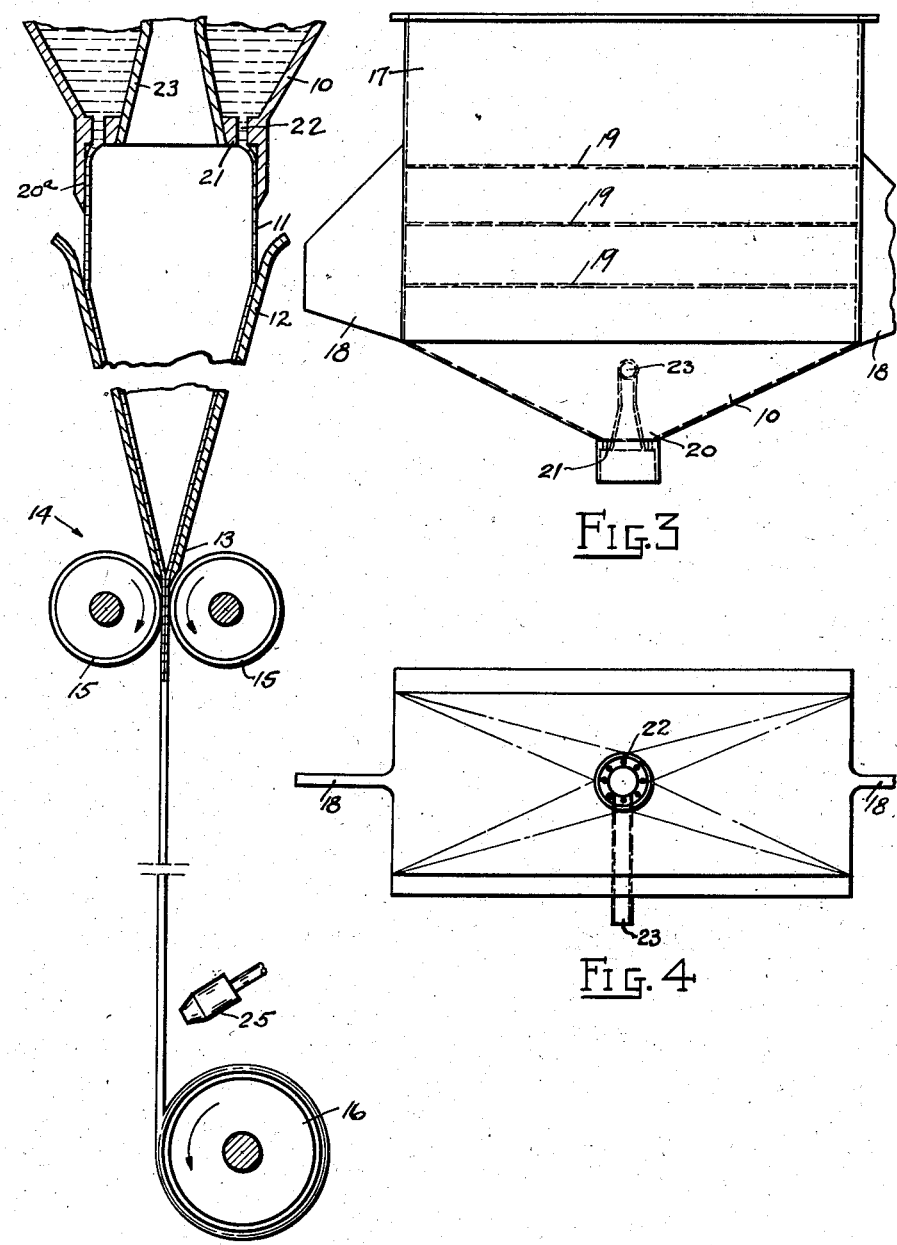

Oct. 9, 1945.  G. SLAYTER ET AL  2,386,511
APPARATUS FOR MAKING GLASS FILM
Filed Oct. 2, 1943  3 Sheets-Sheet 3

James Slayter
Henry Snow
INVENTORS

BY
ATTORNEYS

Patented Oct. 9, 1945

2,386,511

UNITED STATES PATENT OFFICE 2,386,511

APPARATUS FOR MAKING GLASS FILM

Games Slayter and Henry Snow, Newark, Ohio, assignors to Owens-Corning Fiberglas Corporation, Toledo, Ohio, a corporation of Delaware Application October 2, 1943, Serial No. 504,786

5 Claims. (Cl. 49—17)

This invention relates to an improved apparatus for manufacturing glass film.

There are numerous and diversified uses for glass film produced in accordance with this invention. However, for the purpose of this description, it will suffice to point out that the product resulting from the use of the apparatus claimed herein is not only capable of replacing mica in practically all of its numerous applications but, in addition, possesses the advantage that it may be fashioned in practically any size sheet, as distinguished from mica sheets which are necessarily formed of a multitude of relatively small flakes.

With the above in view, the present invention has as one of its objects the manufacture of relatively wide thin sheets of glass on a production basis.

Heretofore it has been extremely difficult to produce glass in very thin sheets or flakes of any appreciable size. One prior attempt to obtain such glass was effected by blowing a large glass bubble until it broke or fractured. This produced fragments of unusually small size, a great many of which were slightly wedge-shaped due to the conditions attendant the blowing of the bubble. More recent methods of producing foliated glass consist in flowing or drawing glass in the form of a thin walled tube or cylinder which is afterward broken into small pieces. In a previous attempt to produce a thin sheet of glass within the range of .0001 to .0005 inch in thickness a continuous strip or ribbon was employed. It was found that as the stream issued from the melter bushing it had a tendency to neck in to approximately two-thirds of its former width and as it was attenuated at high speed a substantial bead formed along each edge. This, of course, proved undesirable and was due mainly to the effect of surface tension on the glass of the extreme thinness of the attenuated ribbon.

It is another object of the invention to form sheets of thin glass without marginal beads by flowing molten glass in the form of a tubular stream and attenuating it to a film-like thickness.

In attempting to flatten tubes formed in the above manner to obtain flat sheets or ribbons therefrom, the walls at the point of folding or creasing become hardened or set before they can be brought entirely together and thus form a hollow edge which shatters as the ribbon is engaged by the attenuating rolls. This greatly reduces the available flat width of the sheet or ribbon throughout which the thickness is substantially uniform within normal commercial limits. It is another object of the invention to form a thin walled tube of glass which may be attenuated and flattened into a ribbon of uniform thickness and of any desired practical width and length.

It sometimes occurs in flattening a tube of the above character by means of rolls or other attenuating means that wrinkles are formed in the plane surface. This results in an undesirable condition by producing a wall having an uneven surface and varying thickness and it is a further object of the invention to form a ribbon of glass having plane surfaces which are free of wrinkles and other blemishes.

A further feature of this invention is to partially flatten a tubular stream of glass before it is introduced to the attenuating means and thereby minimize fracture and wrinkling of the glass during the combined attenuating and flattening operation.

In particular, the glass stream is progressively flattened as it approaches the attenuating means by a tube arranged to receive the glass stream and having the portion of the tube adjacent the delivery end gradually merging into a flat delivery end to introduce a partially flat strip of glass to the combined attenuating and flattening means. Thus, the amount of working or distortion of the glass during the final flattening operation by the attenuating means is reduced and breakage of the ribbon is avoided.

A still further object of this invention is to urge and maintain the walls of the stream toward the inner surfaces of the tube by introducing pressure therein as the stream passes through the tube. Thus the walls of the stream are held against collapsing while in a plastic state.

A still further object of the invention is the formation of a laminated ribbon of glass which is accomplished by forming a thin walled tube of glass, flattening the tube to form a double ply ribbon, and introducing a bonding agent into the tube before it is flattened.

In practicing the present invention it has been found that the adjacent thin walls of the ribbon have a tendency to abrade each other when the ribbon is rolled or coiled. It is an object of this invention to alleviate this condition by applying a lubricating agent to the interior surface of the walls of the tube as the tube is attenuated to prevent self-abrasion during subsequent handling thereof.

The foregoing, as well as other objects, will be made more apparent as this description proceeds especially when considered in connection with the accompanying drawings wherein:

Figure 2 is a fragmentary semi-diagrammatic sectional view of the apparatus taken at right angles to the showing in Figure 1;

Figure 3 is a front elevational view of the bushing employed for flowing molten glass in the form of a hollow stream;

Figure 4 is a bottom plane view of the bushing shown in Figure 3;

Figure 5 being a perspective view of the bushing from beneath, and Figure 6 a fragmentary bottom plan view showing the discharge orifices.

Briefly described, glass of a specified formula is introduced into a bushing 10 and is melted in the bushing by the application of sufficient heat to impart the desired flow characteristics to the glass. The molten glass is discharged from the bushing in the form of a hollow stream 11 and the latter is introduced into the upper end of a vertical tube 12 having the lower or delivery end portion 13 flattened to correspondingly flatten the stream 11. In this connection it will be noted that the glass stream is internally supported and maintained in contact with the inner surface of the tube 12 by introducing fluid under pressure into the upper end of the hollow stream.

Figure 1:
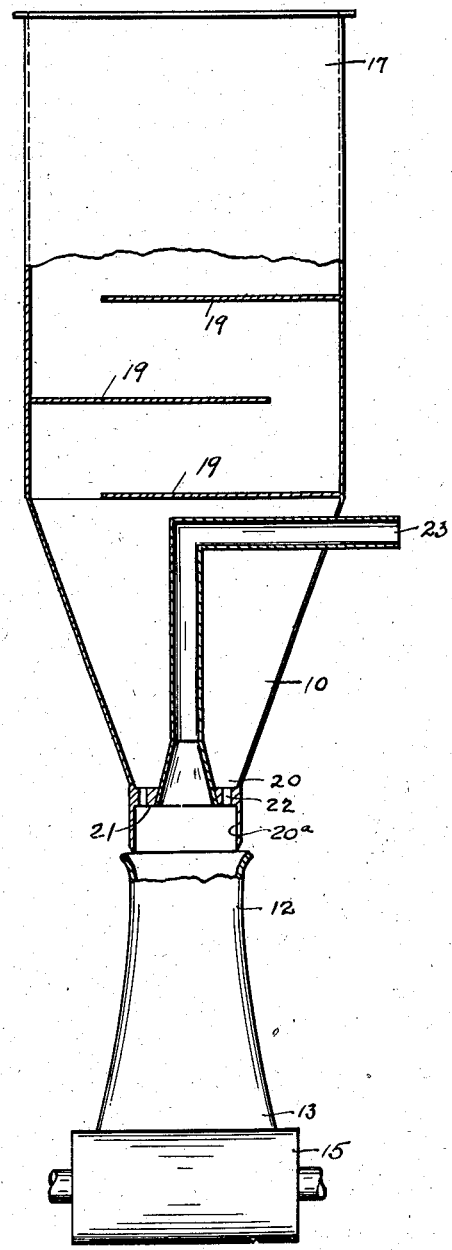
Figure 1 is a diagrammatic sectional view of one type of apparatus found satisfactory for manufacturing glass film.

As the flattened stream discharges from the delivery end 13 of the tube 12 it is introduced to a combined attenuating and flattening device 14 shown in Figure 1 as comprising a pair of rolls 15. The rolls 15 are respectively supported at opposite sides of the path of travel of the stream in close proximity to each other and are operatively connected to suitable driving mechanism (not shown) for relatively high speed rotation in opposite directions toward each other. The rolls 15 are of a length somewhat greater than the width of the delivery end of the tube 12 and not only further flatten the stream 11 to form a wide very thin ribbon of glass but also exert a pulling force on the ribbon in a downward direction to attenuate the stream.

The stretching of the thin walls of the tubular stream as the shape is changed from cylindrical at the bushing orifice to the elongated and flattened conformation adjacent the attenuating rolls sometimes causes wrinkles to be formed along the edges. This is an unsatisfactory condition due to the tendency of the wrinkles to extend well into the surface of the ribbon and thus produce a film having an uneven surface and varying in thickness beyond the practical limits of tolerance. By employing the tube 12 it has been found that these difficulties are substantially reduced, thus increasing the usable output of film and limiting the waste accordingly.

It follows from the above that the hollow stream of glass 11 is partially flattened at a gradual rate by the tube 12 prior to entering the final flattening and attenuating device 14. This minimizes any tendency to over stress the hollow glass stream and avoids fracturing the stream by the cooperating rolls 15. In this manner it is possible to produce a continuous very thin glass ribbon of substantial width which may be collected or packaged on a rotating spool 16.

The bushing 10 shown in the several figures of the drawings is formed of a material having good electrical as well as heat conducting characteristics and comprises a container portion 17 open at the top to enable glass batch briquettes or marbles to be readily introduced into the bushings. In the present instance the contents of the bushing is heated to the desired temperature by passing an electric current through the bushing and for this purpose a pair of terminal lugs 18 are respectively integrally joined to opposite sides of the container portion 17 of the bushing.

As shown particularly in Figures 1 and 3, the container portion 17 of the bushing is provided with baffles 19 arranged to compel the glass to travel along a circuitous passage as it passes down through the container portion. Actually the glass is compelled to take a zigzag course from one side of the bushing to the other during its flow to the bottom or discharge end of the bushing. Thus, the baffles 19 retard the flow of glass through the heat zone or container portion 17 of the bushing and also compel the glass to flow in heat conducting relation to the container walls during passage of the glass to the discharge end of the bushing. As a result, the glass is thoroughly mixed and uniformly heated to the temperature required to provide the required homogeneity and viscosity or flow characteristics.

The walls of the container portion 17 taper inwardly at the bottom of the container to form a centrally arranged discharge area 20 embodying an annular depending wall 20ª cylindrical in cross section and having a plate 21 suitably secured therein. The plate 21 is formed with a multiplicity of discharge orifices 22 spaced from each other around the periphery of the plate to enable molten glass to flow from the container portion 17 in the form of streams. The heat and viscosity of the glass is adjusted so that the streams flowing from the orifices 22 thoroughly wet the inner surface of the tubular discharge wall 20ª below the plate 21 and unite to form the tubular glass stream 11.

As the glass stream 11 flows from the discharge wall 20ª of the bushing it enters the vertical tube 12 and is progressively flattened by the delivery end portion 13 of the tube so that the peripheral dimension at the flattened end remains substantially equal to the circumference of the discharge wall. As previously stated, the glass stream 11 is internally supported and maintained adjacent the inner surface of the vertical tube 12 by introducing fluid under pressure into the upper end of the tubular stream. In the present instance, air under sufficient pressure to accomplish the above is discharged through a centrally arranged opening formed in the plate 21 by a conduit 23. The conduit 23 is shown in Figure 2 as extending from the plate 21 through one side of the bushing to a suitable source of supply not shown herein. In actual practice, it has been found that an air pressure slightly greater than the pressure of the surrounding atmosphere is sufficient to prevent collapsing of the stream and to maintain the walls of the latter in contact with the flattening tube 12.

As the flattened stream 11 flows from the delivery end of the tube 12, it passes between the rolls 15 which are respectively supported at opposite sides of the path of travel of the stream for rotation in opposite directions. The rolls are driven at a relatively high rate of speed by mechanism not shown herein and not only exert a downward pull on the stream to attenuate the latter but, in addition, further flatten the stream to form a relatively thin wide ribbon of glass.

In some instances, it may be desirable to cement the opposed walls of the tube together as the stream passes between the attenuating rolls 15. If such is the case, an adhesive material or binder is introduced into the tubular stream of glass through either the same conduit 23 provided to supply the air under pressure in the stream or through an additional conduit.

The application of a bonding agent into the glass stream as it is attenuated to a ribbon cements the opposed surfaces together and produces a laminated product of increased strength which can be cut to a design much in the manner of a sheet of mica. The bonded ribbon further is more resistant to damage incurred in handling and subsequent operations than ribbons of unbonded type.

When it is desired to produce the film ribbon and employ only single thicknesses thereof, no bond material is applied and at such times there is a tendency of the opposed walls to abrade each other during subsequent handling, tending to weaken the walls and cause fractures thereof. To overcome this it is possible to introduce a lubricant into the tube as it is formed. The lubricant prevents such abrasion and insures a more uniform product. Such lubricant may be castor oil, vegetable oil or a light mineral oil.

As the relatively wide glass ribbon passes from between the attenuating rolls 15, it may be collected in any one of a number of different ways. In Figure 2 of the drawings, the ribbon is shown as packaged on a suitable spool 16 which is driven at a high rate of speed by any suitable mechanism not shown herein. A lubricating medium, such as low-viscosity mineral oil or the like, is preferably applied to the ribbon of glass by a spray or sprays 25 supported between the attenuating rolls 15 and the packaging spool 16. This arrangement reduces the abrasive action of contacting the glass surfaces as the ribbon is coiled or rolled and tends to minimize breakage thereof.

While the present invention is primarily concerned with the production of film glass in continuous ribbon form, the ribbon may be broken by any suitable means to produce flakes of substantially any desired size.

Figure 5:
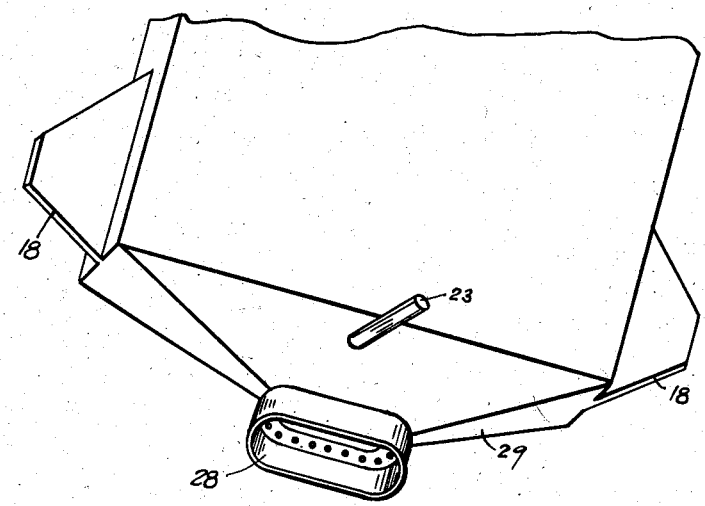
Figures 5 and 6 illustrate a modified form of the bushing which may be employed in practicing the present invention.
Figure 6:
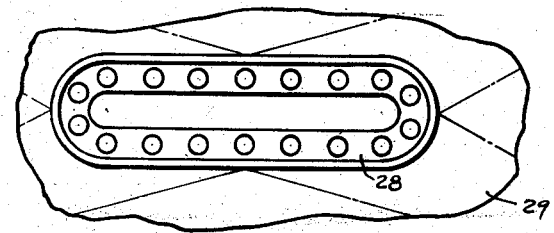

The embodiment of the invention shown in Figures 5 and 6 differs from the construction previously described in that the discharge area 28 of the bushing 29 is an elongated ring having round ends and discharges a correspondingly shaped glass stream. With this arrangement, the glass stream is partially flattened at the bushing thus reducing the flattening action of the attenuating rolls to a minium as the ribbon is formed. Further by reason of the oval shape of the stream the shaping tube 12 may be eliminated in this form of the invention since the stream more nearly approximates the final shape. Also, a lubricating or bonding medium may be employed as previously described.

We claim:

1. Apparatus for producing glass film comprising a bushing having an annular discharge orifice through which molten glass flows in the form of a hollow stream, means for introducing fluid under pressure into the stream, and means for confining the stream including a tube positioned to receive the stream and having a portion which progressively flattens to correspondingly flatten the stream.

2. Apparatus for producing a thin glass ribbon comprising a bushing having an annular discharge orifice through which molten glass flows in the form of a hollow stream, means for introducing fluid under pressure into the stream, a tube supported beneath the bushing in a position to receive the stream as it is discharged from the bushing and shaped at its lower end to flatten the stream to a width greater than the diameter at the discharge orifice, and means at the discharge end of the tube for attenuating the stream to form a thin flat ribbon of glass.

3. Apparatus for producing a thin glass ribbon having means for flowing glass into the form of a hollow stream, a tube positioned to receive the hollow stream and having a flattened portion at the discharge end thereof, and means for introducing fluid into the stream under sufficient pressure to maintain the walls of the glass stream into contact with the inner surface of the tube and thereby correspondingly flatten the stream.

4. Apparatus for producing glass film comprising a bushing having an annular discharge orifice through which molten glass flows in the form of a hollow stream, an elongated tube positioned with the receiving end adjacent the bushing orifice to receive the glass stream flowing from the orifice and having the delivery end flattened, means for introducing fluid into the stream under sufficient pressure to maintain the walls of the stream into contact with the inner surface of the tube, and means supported at the delivery end of the tube for attenuating and further flattening the stream to form a thin flat ribbon of glass.

5. An apparatus for producing glass film in ribbon form comprising a bushing having an elongated discharge orifice through which molten glass flows in the form of a hollow partially flattened stream, a tube arranged adjacent said orifice and adapted to receive the stream flowing therefrom, said tube having its lower end shaped to further flatten the stream, means for introducing air under pressure into the stream to maintain the wall thereof in contact with the wall of said tube, and attenuating means adjacent the lower end of the tube for attenuating the flattened stream to a ribbon.

GAMES SLAYTER.
HENRY SNOW.